United States Patent Office 3,104,942
Patented Sept. 24, 1963

3,104,942
PROCESS FOR DENSIFYING SODA ASH
Erwin C. Handwerk, Grosse Ile, Gerd J. Gunzburger, Detroit, and Jules S. Lapides, Wyandotte, Mich., assignors to Wyandotte Chemicals Corporation, Wyandotte, Mich., a corporation of Michigan
No Drawing. Filed Dec. 21, 1960, Ser. No. 77,274
7 Claims. (Cl. 23—63)

This invention relates to a process for increasing the density of granular soda ash and more particularly it relates to the use of a fluidized bed to increase the density of dense soda ash of granular consistency.

Soda ash having a high density is desirable for a number of reasons. Increased density reduces the bulk of shipments and increases storage capacity. One of the major advantages of increased density soda ash occurs in industries employing batch operations, such as the glass industry. In the glass industry soda ash is used as one of the ingredients of the glass mix. The density of the soda ash determines greatly the yield in glass from each pot of mix, therefore it is desirable to use soda ash of the highest density obtainable to realize the maximum yield per pot of mix.

There are two major processes by which soda ash is produced, i.e. the ammonia-soda process and the trona process.

In the ammonia-soda process sodium bicarbonate is produced in the form of small crystals. These crystals are usually calcined at a high temperature to drive off the water and carbon dioxide leaving a dry anhydrous material called "light ash." Its chemical composition is commercially pure $Na_2CO_3$ and the particles have the shape of the original crystals of sodium bicarbonate but they are skeletons of the original crystals, the cavities being due to driving out the water and carbon dioxide during calcination. These particles have a density of about 50 gms./100 cm.$^3$.

There are several processes by which the density of the light ash of the ammonia-soda process may be increased, however there is only one widely used in the soda ash industry and that is the monohydrate process. In this process a dense ash is made by adding to the hot light ash about 15% (approximately the molar amount) of water, and the water and soda ash are mixed to produce $Na_2CO_3 \cdot H_2O$. This product is dried in a suitable drier which drives off the $H_2O$ leaving anhydrous $Na_2CO_3$. The particles have the physical form of shells of the former crystals of $Na_2CO_3 \cdot H_2O$, but have a density of about 60 to 95 gms./100 cm.$^3$ or higher.

In the trona process, as described in U.S. Patent No. 2,346,140, naturally occurring trona is dissolved, purified, and recrystallized as pure sodium sesquicarbonate. The sodium sesquicarbonate crystals produced from the raw trona are calcined to soda ash. The soda ash produced by this process consists largely of acicular crystals and is a light soda ash having a density slightly higher than that produced by the ammonia-soda process. Its physical properties are different from ordinary light soda ash which is produced by the ammonia-soda process and it is more difficult to produce dense soda ash of conventional physical properties suitable for glass making from soda ash produced by the calcination of sodium sesquicarbonate by the processes of densification ordinarily employed. Therefore, dense ash is usualy made from trona by the process described in U.S. Patent No. 2,770,524. In this process trona is first calcined and then dissolved in water and recycled mother liquor; after which the impurities are removed. Anhydrous sodium carbonate is crystallized from this solution either in evaporators or in a pressure heating vessel maintained at a high temperature and pressure and dried in a calciner. The dense soda ash produced by this process has a density approximately the same as that produced from ammonia-soda process soda ash by the monohydrate process.

While the previously described densifying processes produce soda ash of increased density, it is desirable for the above reasons to have soda ash of a still higher density.

Therefore, it is an object of the present invention to provide a method to increase the density of densified soda ash.

The above and other objects are accomplished by a process which comprises contacting dense granular soda ash in a vessel with a gas stream having a linear velocity of from about 90° to 250° feet per minute. The temperature of the soda ash when initially contacted is from about 0° C. to 220° C. and the temperature of the gas stream is from about 0° C. to 100° C. when entering the vessel.

In the process of this invention dense soda ash from a densifying process, such as the monohydrate process and trona process, is fluidized in a cylindrical vessel having a gas distributor plate by a stream of gas introduced near the bottom of the vessel and having an upward flow. The soda ash is introduced into the fluidizing vessel at any point above the distributor plate. The process may be batch or continuous.

The soda ash has a density of greater than 60 gms./100 cm.$^3$ when introduced into the vessel. The temperature of the dense soda ash from the densifying process is not a limiting factor in this invention. It is normally in the range of from about 0° C. to 220° C. and if the soda ash is conveyed directly from the drier with little cooling the temperature is in the range of from about 170° C. to 220° C. before being contacted by the gas stream. The particle size of the soda ash is not a limiting factor in this invention and will normally vary widely.

The gas stream used for fluidization will normally be air, however any gas inert as to soda ash may be used, such as nitrogen and oxygen. The temperature of the gas stream is in the range of from about 0° C. to 100° C. before contacting the soda ash bed. However, an additional advantage of this invention is gained by using a gas having a temperature of from about 0° C. to 50° C. in that the densification process may also act as a cooling process, thereby eliminating a separate cooling process. The velocity of the gas stream when contacting the soda ash bed should be in the range 90 to 250 feet per minute to accomplish the increase in density. While increasing the density of the soda ash the dustiness of the soda ash is also reduced substantially in that the fine material, 200 mesh and below, is carried from the vessel in the gas stream. However, the increase in density by the process of this invention cannot be attributed merely to removing dust. An additional advantage is gained by variation of the gas stream velocity over the range in that particle size separations can be made which will eliminate the need for later screening to separate fine material from the coarse material. The gas may be dry but preferably should have a molal humidity of from about 0.01 to 0.08.

The process described above has been found to increase the density of granular soda ash up to 4%.

The following examples are presented to particularly illustrate the invention but should not be used to limit, unduly, the scope of the invention.

*Example 1*

In a cylindrical vessel 2 feet in diameter and 6 feet in height and having a perforated distributor plate 2 feet from the bottom, 142 pounds of granular soda ash from the monohydrate process at a temperature of 60° C. and having a density of 91.7 gms./100 cm.³ were introduced. Subsequently a stream of air of 0.0125 molal humidity and 15° C. was passed upwards through the distributor plate and through the soda ash bed at a linear velocity of 142 ft./min. The soda ash was fluidized for 10 minutes after which the supply of air was shut off. The contents of the vessel were found to have a density of 92.8 gms./100 cm.³, which is a 1.2% increase.

*Example 2*

In the vessel of Example 1, 142 pounds of granular soda ash from the monohydrate process at a temperature of 60° C. and having a density of 93.3 gms./100 cm.³ were introduced. Subsequently a stream of air of 0.0125 molal humidity and 15° C. was passed upward through the distributor plate and through the soda ash bed at a linear velocity of 175 ft./min. The soda ash was fluidized for 10 minutes after which the supply of air was shut off. The contents of the vessel were found to have a density of 96.4 gms./100 cm.³, which is a 3.3% increase.

*Example 3*

In the vessel of Example 1, 142 pounds of granular soda ash from the monohydrate process at a temperature of 60° C. and having a density of 94.4 gms./100 cm.³ were introduced. Subsequently a stream of air of 0.0125 molal humidity and 15° C. was passed upward through the distributor plate and through the soda ash bed at a linear velocity of 200 ft./min. The soda ash was fluidized for 10 minutes after which the supply of air was shut off. The contents of the vessel were found to have a density of 97.4 gms./100 cm.³, which is a 3.2% increase.

*Example 4*

In the vessel of Example 1, 142 pounds of granular soda ash from the monohydrate process at a temperature of 60° C. and having a density of 94.0 gms./100 cm.³ were introduced. Subsequently a stream of air of 0.0125 molal humidity and 15° C. was passed upward through the distributor plate and through the soda ash bed at a linear velocity of 200 ft./min. The soda ash was fluidized for 10 minutes after which the supply of air was shut off. The contents of the vessel were found to have a density of 96.6 gms./100 cm.³, which is a 2.8% increase.

*Example 5*

In the vessel of Example 1, 189 pounds of granular soda ash from the monohydrate process at a temperature of 60° C. and having a density of 94.8 gms./100 cm.³ were introduced. Subsequently a stream of air of 0.0125 molal humidity and 15° C. was passed upward through the distributor plate and through the soda ash bed at a linear velocity of 200 ft./min. The soda ash was fluidized for 10 minutes after which the supply of air was shut off. The contents of the vessel were found to have a density of 96.9 gms./100 cm.³, which is a 2.2% increase.

*Example 6*

In the vessel of Example 1, 189 pounds of granular soda ash from the monohydrate process at a temperature of 60° C. and having a density of 95.4 gms./100 cm.³ were introduced. Subsequently a stream of air of 0.0125 molal humidity and 15° C. was passed upward through the distributor plate and through the soda ash bed at a linear velocity of 220 ft./min. The soda ash was fluidized for 10 minutes after which the supply of air was shut off. The contents of the vessel were found to have a density of 98.7 gms./100 cm.³, which is a 3.5% increase.

We claim:

1. A process for increasing the density of granular soda ash which comprises contacting granular soda ash particles having a density of at least 60 gms./100 cm.³ in a vessel with a stream of gas selected from the group consisting of air, nitrogen and oxygen, having a velocity of from about 90 to 250 feet per minute wherein said granular soda ash is at a temperature of from about 0° C. to 220° C. when initially contacted and wherein said gas is at a temperature of from about 0° C. to 100° C. when entering said vessel.

2. The process of claim 1 wherein the gas is air.

3. The process of claim 1 wherein the gas is air having a molal humidity of from about 0.01 to 0.08.

4. The process of claim 1 wherein the gas is air having a temperature of from about 0° C. to 50° C.

5. The process of claim 1 wherein the granular soda ash is at a temperature of from about 170° C. to 220° C. when initially contacted by said stream of gas.

6. A process for producing dense soda ash which comprises adding water to light soda ash to produce the monohydrate of soda ash, heating the soda ash monohydrate to produce dense anhydrous soda ash, and passing the heated and dried dense ash, having a density of at least 60 gms./100 cm.³ and a temperature of from about 0° C. to 220° C., to a vessel while passing through said vessel a stream of gas selected from the group consisting of air, nitrogen and oxygen, having a temperature of from about 0° C. to 100° C. at a velocity of from about 90 to 250 feet per minute.

7. A process for producing dense soda ash which comprises heating trona to produce soda ash, dissolving the soda ash, crystallizing anhydrous soda ash from the solution, heating the soda ash to produce dry dense soda ash, and passing the heated and dried dense soda ash, having a density of at least 60 gms./100 cm.³ and a temperature of from about 0° C. to 220° C., to a vessel while passing through said vessel a stream of gas selected from the group consisting of air, nitrogen and oxygen, having a temperature of from about 0° C. to 100° C. at a velocity of from about 90 to 250 feet per minute.

References Cited in the file of this patent

UNITED STATES PATENTS

| | | |
|---|---|---|
| 2,459,414 | Carrier | Jan. 18, 1949 |
| 2,770,524 | Seaton | Nov. 12, 1956 |
| 2,970,037 | Caldwell | Jan. 31, 1961 |

FOREIGN PATENTS

| | | |
|---|---|---|
| 535,550 | Canada | Jan. 8, 1957 |
| 535,551 | Canada | Jan. 8, 1957 |